United States Patent [19]

Godbersen

[11] Patent Number: 5,064,336

[45] Date of Patent: Nov. 12, 1991

[54] WINCH ASSEMBLY FOR BOAT TRAILER

[76] Inventor: Byron L. Godbersen, Lake LaJune Estates, Ida Grove, Iowa 51445

[21] Appl. No.: 565,696

[22] Filed: Aug. 13, 1990

[51] Int. Cl.⁵ .............................................. B60P 3/10
[52] U.S. Cl. .................................. 414/559; 254/326; 254/332; 280/414.1
[58] Field of Search ................ 414/559, 494, 529-536; 280/414.1; 254/325, 326, 332, 389, 413; 114/344

[56] References Cited

U.S. PATENT DOCUMENTS

| | | | |
|---|---|---|---|
| 2,608,314 | 8/1952 | Krider | 414/536 X |
| 2,712,370 | 7/1955 | Westfall | 254/325 X |
| 3,044,646 | 7/1962 | Sperow | 414/534 X |
| 3,069,038 | 12/1962 | Ahlbin | 280/414.1 X |
| 3,140,003 | 7/1964 | Horner | 280/414.1 X |
| 3,515,297 | 6/1970 | Symons | 254/326 |
| 3,945,517 | 3/1976 | Cosley | 254/389 X |
| 3,974,924 | 8/1976 | Ullman | 414/531 |
| 4,319,862 | 3/1982 | Cook | 414/529 X |
| 4,592,694 | 6/1986 | Johnson | 414/534 |
| 4,687,219 | 8/1987 | Rendzio | 280/414.1 |
| 4,781,515 | 11/1988 | Johnson | 414/534 |
| 4,802,685 | 2/1989 | Godbersen | 414/559 X |

Primary Examiner—David A. Bucci
Attorney, Agent, or Firm—Henderson & Sturm

[57] ABSTRACT

A winch assembly for mounting on a boat trailer having a casing substantially enclosing the conventional winch apparatus, and including adjustable mounting provisions for maintaining the winch strap in alignment with and close proximity to a bow stop for proper securement to the bow eye of the boat for loading purposes, regardless of the position of the winch assembly on the boat trailer.

6 Claims, 2 Drawing Sheets

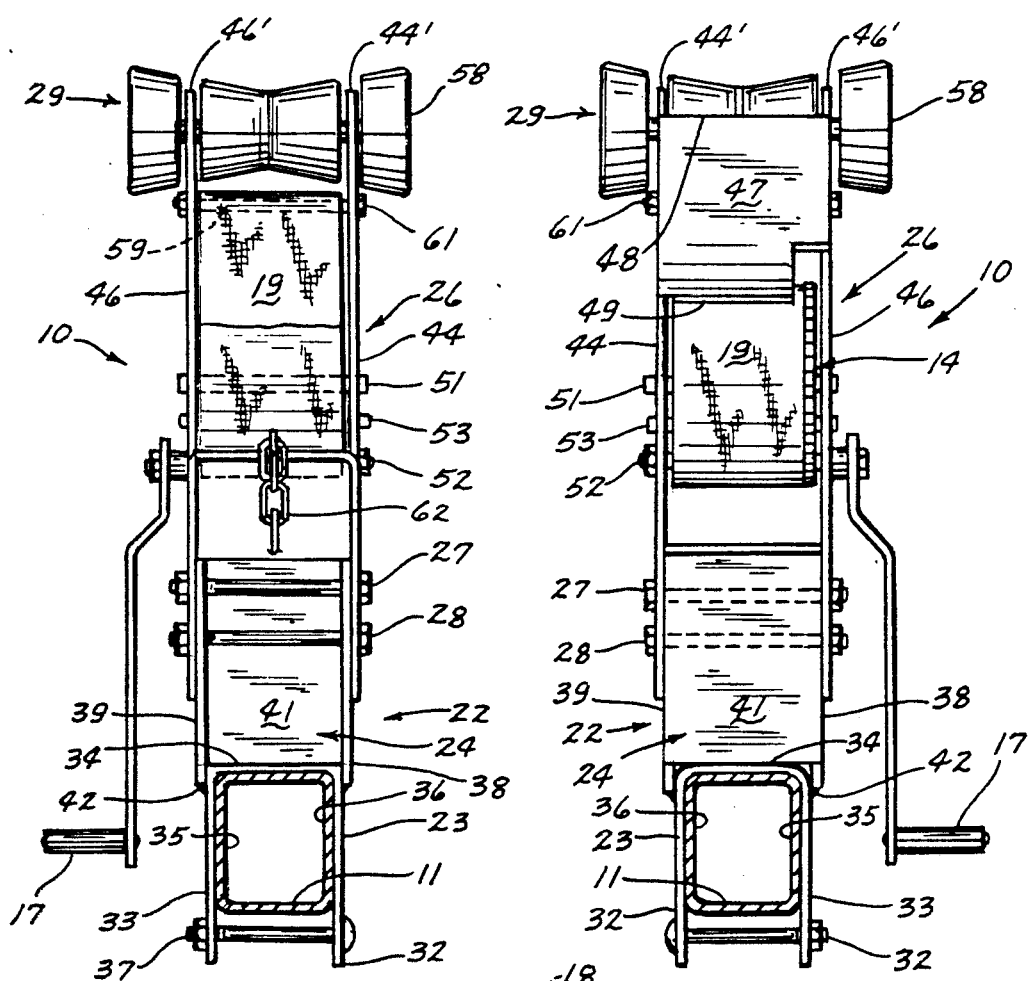
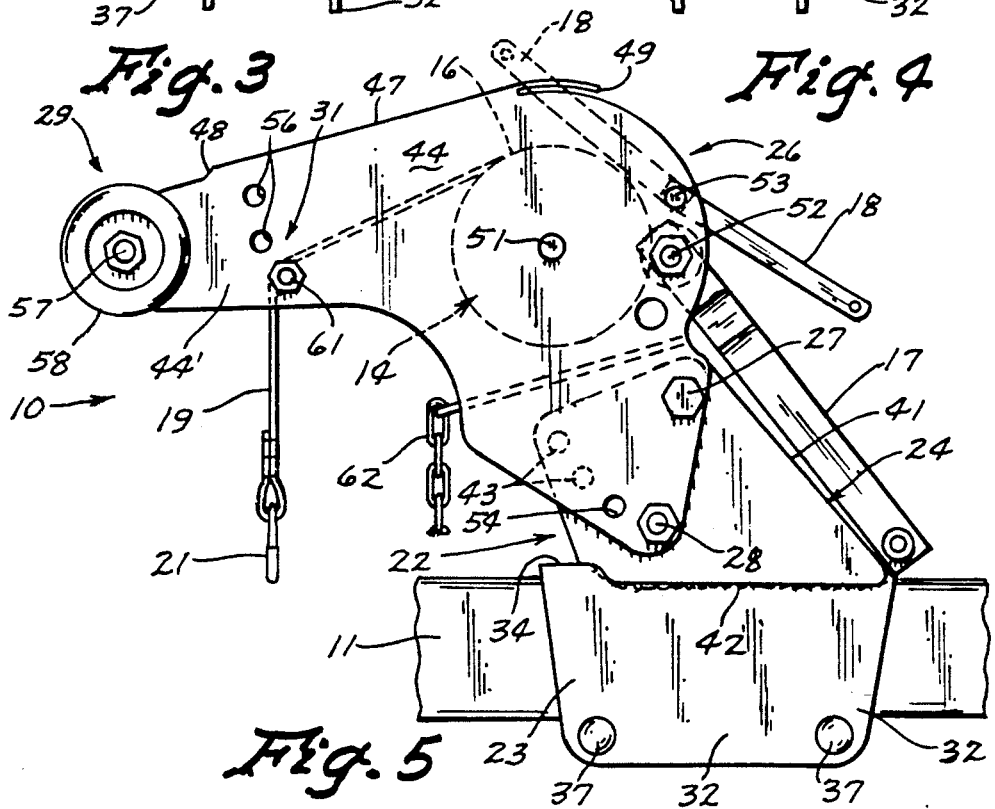

WINCH ASSEMBLY FOR BOAT TRAILER

TECHNICAL FIELD

The present invention relates to boat trailers in general, and in particular to a winch assembly for adjustable mounting on the tongue section of a boat trailer for loading a boat onto the trailer.

BACKGROUND ART

An integral element of contemporary pleasure boat and like trailers is a conventional winch assembly attached normally to the tongue section of the trailer and connectable to the boat for pulling the boat out of the water and onto the trailer for land transportation of the boat.

The winch comprises a drum normally open to the elements, rotatable by a handle and locked into place by a latch, the drum having a cable or strap connected to it with a free end detachably connected to the bow eye of a boat secured to the bow. The winch may be mounted directly onto the tongue or by a post and has associated therewith a bow stop rearwardly of the winch, the bow stop arranged to engage the bow of the boat.

Although it is ideal to position the bow eye of the boat in a snug engagement with any type of bow stop, the prior art does not show a correlation between the winch strap and the bow stop to achieve the ideal. It is partly to obtain that ideal condition that this invention is directed.

DISCLOSURE OF THE INVENTION

This invention relates to a winch assembly comprising a winch drum including a strap having a free end adapted to be connected to the boat bow eye, a post unit detachably mounted on the tongue element for fore and aft movement thereon and having an upright section, a casing adjustably mounted on the upright section and substantially encasing the winch assembly, a bow stop unit secured to a rear end of the casing for engagement with the bow of the boat above the bow eye, and a strap aligner adjustably mounted within the casing to maintain the strap aligned with the bow stop during the pulling of the boat onto the trailer.

It is an object of this invention to provide a new and novel winch assembly for a boat trailer.

It is another object of this invention to provide an improved boat trailer winch assembly wherein the winch drum mechanism is encased and protected from the elements.

It is yet another object of this invention to provide a boat trailer winch assembly which encases the winch mechanism while maintaining the winch strap aligned with the bow stop for proper securing at the bow eye.

BRIEF DESCRIPTION OF THE DRAWINGS

These and other attributes of the invention will become more clear when a thorough study of the following description of a preferred embodiment of the invention, particularly when reviewed in conjunction with the accompanying drawings wherein:

FIG. 3 is a rear elevational view taken along the lines 3—3 in FIG. 1;

FIG. 4 is a front elevational view taken along the lines 4—4 in FIG. 1; and

FIG. 5 is a view similar to FIG. 1 and showing an adjusted position of the casing and the strap aligner.

BEST MODE FOR CARRYING OUT THE INVENTION

Figure 1:
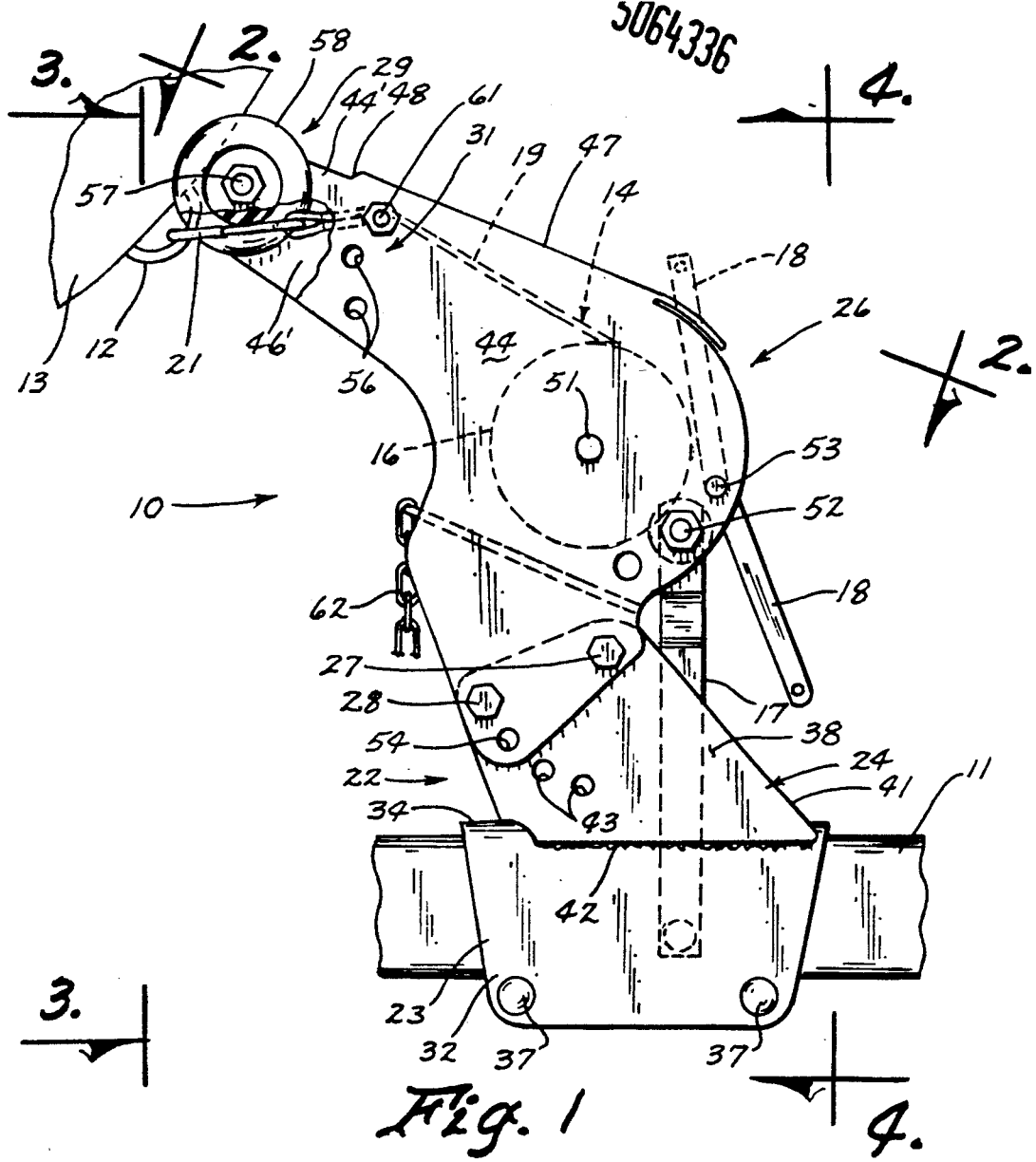
FIG. 1 is a side elevational view of the winch assembly of this invention shown mounted on a fragmentary portion of a boat trailer tongue and showing the winch strap connected to the bow eye of a boat.

The winch assembly of this invention is indicated generally at (10) in FIG. 1 and is mounted on the tongue element (11) of a conventional boat trailer (not shown). The boat trailer may comprise an A-type frame in plan view mounted rearwardly on a wheel and axle unit, and forwardly on a jack stand with the forward tongue element (11) having a hitch for connection to a prime mover. Elongated bunks and/or gangs of rollers are normally mounted on the trailer for engaging and supporting the boat on the trailer in a cradling manner. The boat is provided with an eye (12) (FIG. 1) at the bow (13) for pulling connection to the winch assembly (10) as detailed hereinafter.

The winch assembly (10) comprises generally a conventional winch device (14) having a rotatable drum (16), an operating handle (17), a drum release and locking latch (18), and an elongated strap (19) with one end (not shown) secured to the drum (16) and with a free end secured to a clasp (21) (FIG. 5). A post unit (22) is included, having a mounting section (23) for detachably embracing the tongue element (11) at any longitudinally spaced position thereof, and having further an upright section (24) integral with or welded to the mounting section (22).

Figure 2:
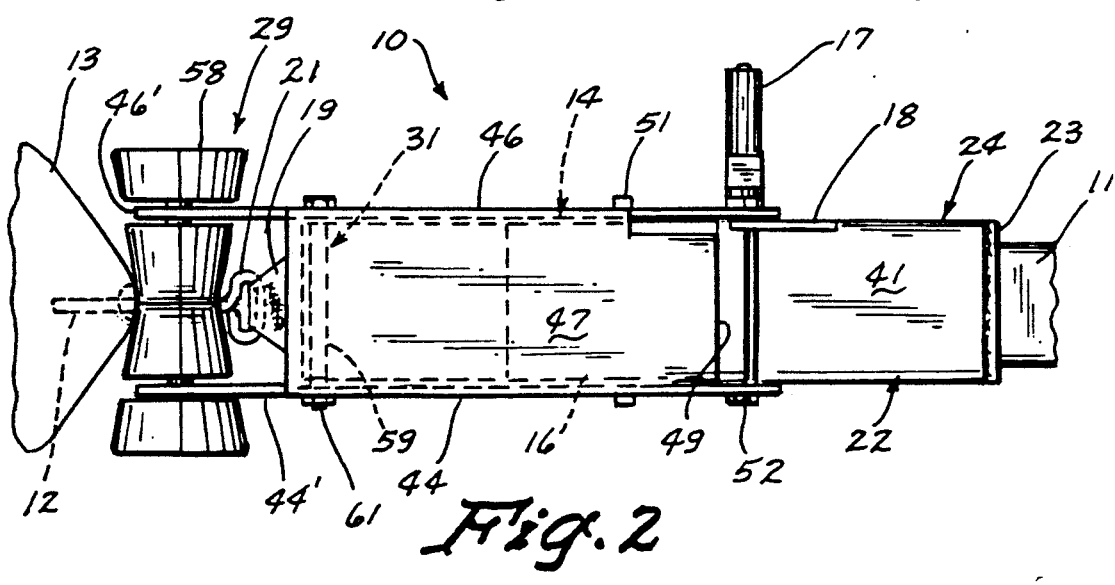
FIG. 2 is a plan view of the winch assembly as taken along the lines 2—2 in FIG. 1.

As a part of the winch assembly (10), a casing unit (26) is provided, adjustably mounted on the upright section (24) by a pivot bolt (27) (FIG. 1) and a locking bolt (28), and substantially encasing the winch device (14) except for the handle (17), latch (18), and free end and clasp (21) of the strap (19). At the rearward end of the casing unit (26), a bow stop device (29) (FIGS. 1 and 2) is rotatably mounted for eventual engagement with the boat bow (13); and the winch assembly (10) is completed with a strap aligner (31) (FIGS. 1-3) mounted within the casing unit (26) for maintaining the strap (19) in an aligned position with the bow stop device (29) as the winch assembly (10) operates to draw the boat forwardly, such that the eye (12) snugs up against the base of the bow stop device (29).

More particularly, the mounting section (23) of the post unit (22) is an inverted U-shaped element having depending sides (32), (33) with a top (34), and with the sides (32), (33) clamped to the sides (35), (36) of the tongue element (11) by means of bolt fasteners (37). The upright section (24) is also U-shaped with sides (38), (39) facing rearwardly from a face panel (41) (FIGS. 3 and 4) and with the lower edges of the sides (38), (39) welded as at (42) to the upper corners of the mounting section (23). Transversely aligned holes (not shown) are provided in the upright section sides (38), (39) for receiving the pivot bolt (27) (FIG. 1); and to provide for adjustable mounting of the casing unit (26) on the upright section (24), a plurality of transversely aligned, arcuately spaced holes (43) are also formed in the sides (38), (39) for accommodating the lock bolt (28).

The casing unit (26) has a question mark appearance in side elevation (FIGS. 1 and 5) and comprises side panels (44), (46) of like shape, connected by a top panel (47) with a rear edge (48) (FIG. 2) and a leading edge (49). Appropriate openings (not shown) are formed in the side panels (44), (46) for mounting a drum shaft (51), a handle shaft (52), and a latch shaft (53), and are also formed in the base (54) of the panels (44), (46) for transverse alignment with like openings in the upright section (24) for receiving the pivot bolt (27), and for adjustably receiving the lock bolt (28) as best shown in alternate positions of the casing unit (26) as mounted on the upright section (24) (FIGS. 1 and 5). Also, for a purpose detailed hereinafter, a plurality of transversely aligned, arcuately spaced openings (56) (FIG. 1) are formed in rearward portions of the side panels below the rearward edge (48) of the top panel (47); and which openings (56) are formed intermediate the winch drum (16) and the bow stop device (29). A safety chain (62) is secured to the panels (44), (46) for connection to the bow eye (12) in case of failure of the winch device (14).

Rearwardly extended portions (44'), (46') of the casing side (44), (46) also having openings (not shown) to accommodate a bolt (57) (FIGS. 1 and 2) for rotatably mounting thereon an hourglass shaped bow stop (58) of hard rubber or the like. The shape of the bow stop (58) is such that it will tend to nest the narrowest portion of the bow (13) (FIG. 1) and thus align the bow eye (12) with the centerline of the winch strap (19) (FIG. 3).

To position the bow eye (12) of the bow directly below and up against the boat stop (58) (FIG. 1) of the winch assembly, thereby tending to prevent the bow (13) of the boat from moving relative to the winch assembly (10) and thus the boat trailer, the strap aligner (31) is provided to maintain the strap (19) in general alignment with the bow stop (58), and thus wherein the strap (19) extends in close proximity to and directly below the bow stop (58) (FIG. 1). The strap aligner (31) comprises a tubular member (59) of a length to extend between the casing side panels (44), (46) (FIG. 2) and to be mounted in alignment with any one of the pair of openings (56) by a fastening bolt (61).

Thus, by virtue of the adjustability of the post unit mounting section (23) relative to the tongue element (11), and/or of the casing unit (26) relative to the upright section (24), and/or of the strap leveler (31) relative to the casing unit (26), the winch strap (19) is kept aligned with the bow stop (58) for proper securing of the boat. Referring to FIG. 1, the casing unit (26) is locked in its uppermost position, with the strap aligner (31) secured to the uppermost pair of openings (56), and FIG. 5 shows the casing unit (26) locked in its lowest position with the strap aligner secured to the lowermost pair of openings (56), thus as to this particular mounting position of the winch assembly (10) on the tongue element (11), and as to this particular bow eye (12) location - dependent of course upon the size and shape of the boat, maintaining the winch strap (19) closely aligned with the bow stop (58) when secured to the bow eye (12).

I claim:

1. A winch assembly for mounting on a boat trailer having a tongue element, and for pulling connection to the bow eye of a boat being loaded onto the trailer, the winch assembly comprising:

winch means including a rotatable drum, and having an elongated strap wrapped about said drum and with one end thereof free for detachable connection to the bow eye;

post means detachably mounted on the tongue element and including an upright section extended above the tongue element;

casing means adjustably mounted on said post means for pivotal movement about a normally horizontal axis, said casing means substantially encasing said winch means;

bow stop means rotatably mounted on said casing means and adapted to engage the bow of the boat above the bow eye upon operation of the winch means; and strap aligning means connected to said casing means and interposed between said winch drum and said bow stop means whereby to maintain said strap substantially aligned with the bow stop means during pulling of the boat upon the trailer by the winch means.

2. The winch assembly of claim 1, and further with said upright section having a plurality of pairs of fastening openings formed transversely therein and in an arcuate manner;

said casing means including a casing having a pair of transversely spaced side panels connected by a top panel embracing said winch drum.

3. The winch assembly of claim 2, and further with said casing side panels having a plurality of arcuately spaced, transversely aligned pairs of openings formed therein.

4. The winch assembly of claim 2, and further with said boat stop means mounted on said side panels in spaced relation to said winch drum.

5. The winch assembly of claim 3, and further with said strap aligning means comprising an elongated member interposed between said side panels and aligned with one of said pairs of said side panel openings.

6. The winch assembly of claim 5, and further wherein said casing side panel aligned pairs of openings are formed in said casing side panels intermediate said winch drum and said boat stop means.

* * * * *